Feb. 9, 1932.  L. T. MEDHOLDT  1,844,330
APPARATUS FOR TRUING THE TEETH OF SAW BLADES
Filed Aug. 8, 1927  2 Sheets-Sheet 1
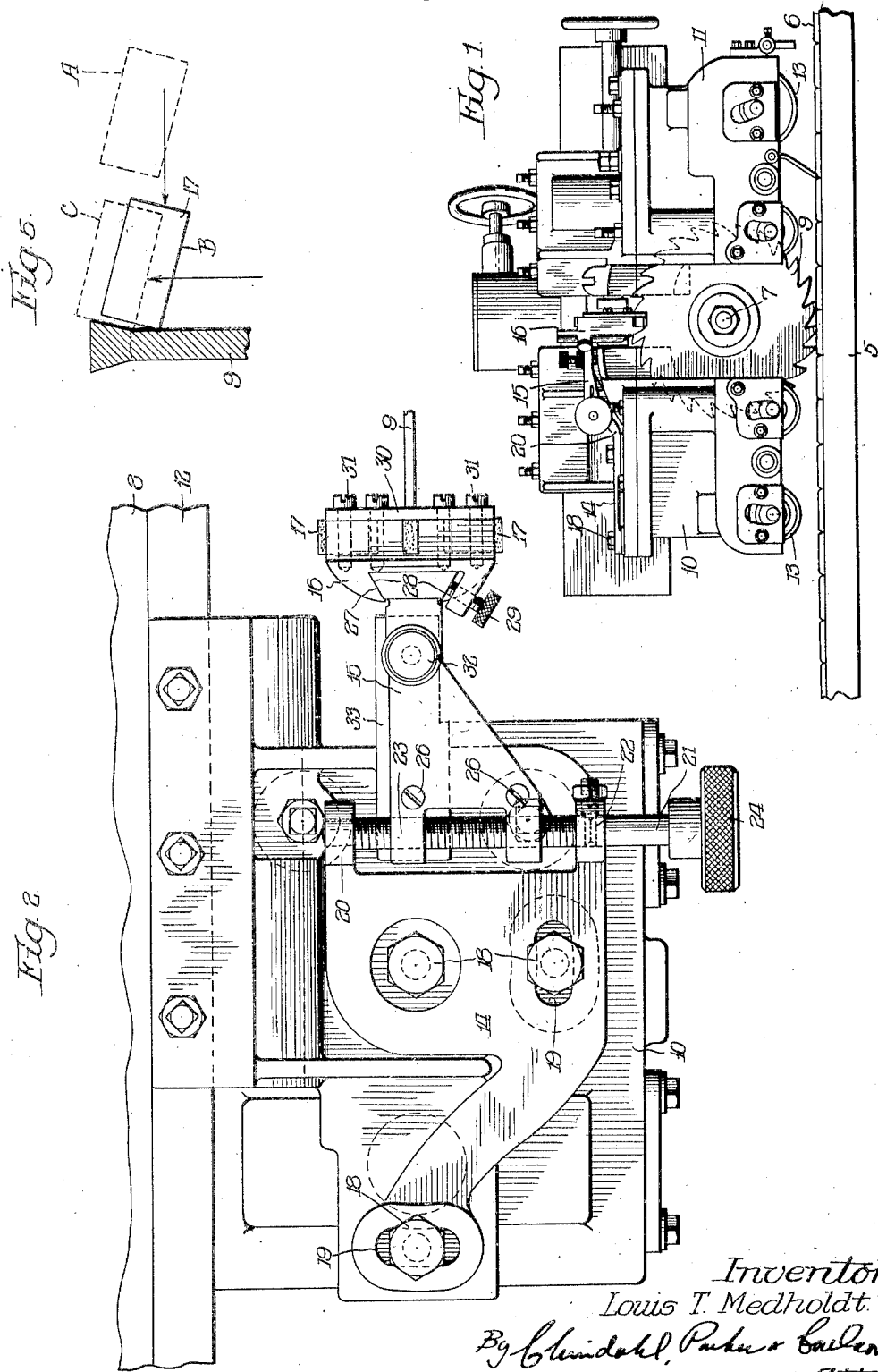
Inventor
Louis T. Medholdt Feb. 9, 1932.  L. T. MEDHOLDT  1,844,330
APPARATUS FOR TRUING THE TEETH OF SAW BLADES
Filed Aug. 8, 1927   2 Sheets-Sheet 2
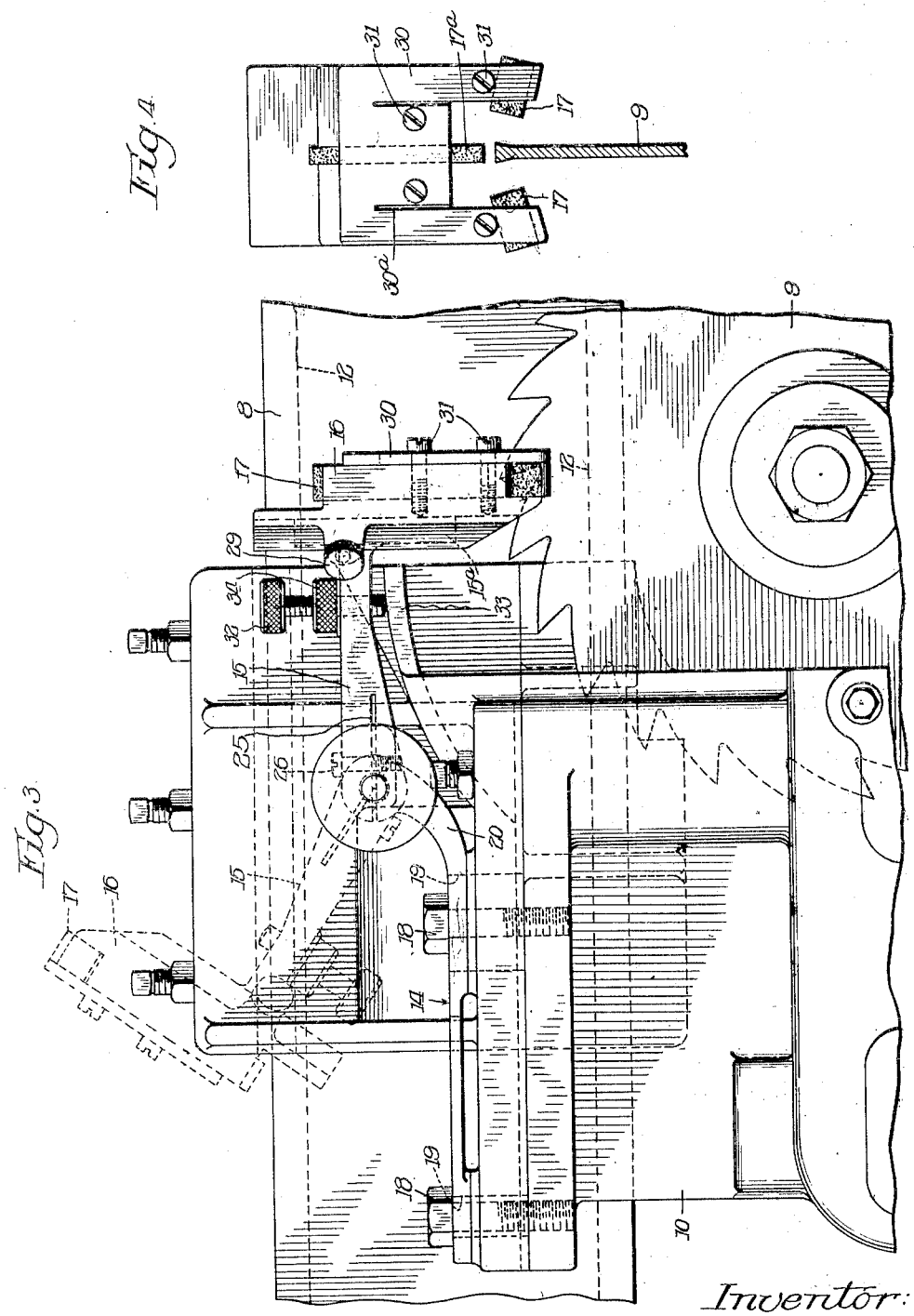
Inventor:
Louis T. Medholdt.
By Chindahl, Parker & Carlson
Attys Patented Feb. 9, 1932

1,844,330

UNITED STATES PATENT OFFICE

LOUIS T. MEDHOLDT, OF ROCKFORD, ILLINOIS, ASSIGNOR TO MATTISON MACHINE WORKS, OF ROCKFORD, ILLINOIS, A CORPORATION OF ILLINOIS

APPARATUS FOR TRUING THE TEETH OF SAW BLADES

Application filed August 3, 1927. Serial No. 211,303.

The invention relates generally to sawing machines and more particularly to an apparatus for truing saw blades.

The invention contemplates primarily sawing machines of a circular blade type such as those commonly known as rippers or jointers, wherein lumber is ripped or jointed for gluing purposes and it is desirable to have the cut edges so perfect that two or more of the pieces, after passing through the machine, may be successfully glued without further finishing. To obtain so accurate a cut it is essential not only to provide the machine with a proper mounting for the saw blade and efficient means for feeding the work through the machine in a straight line, but also to obtain saw blades with teeth which will cut uniformly.

For the purpose of obtaining such uniform teeth it has been the practice to true the teeth of the saw blade while the blade is running at normal speed so that the corresponding cutting edges of the different teeth are in peripheral alinement. This operation is known generally in the art as "jointing" the saw teeth. Generally the dressing of the teeth has been accomplished by positioning an abrasive element with a surface parallel to the side edges of the teeth of the saw then moving the element perpendicularly to the saw blade and into contact with the sides of the saw teeth. This method, however, has caused the abrasive element to be notched at the point where it contacts the tips of the saw teeth and not only has made it necessary to renew the element frequently but has caused improper jointing of the teeth.

It is the general object of the invention to provide a new and improved apparatus for truing saw blades whereby teeth will be obtained having uniform peripherally alined cutting edges.

Another object is to provide a saw jointing apparatus which may readily be mounted on the saw machine frame so that the saw may be trued without removal from the machine.

Another object is to provide a saw truing apparatus which is safe in operation and readily manipulated.

A further object is to provide an improved method of dressing saw teeth whereby an abrasive element is moved into engagement with the sides of the teeth by movement outwardly from and substantially radially with respect to the saw axis.

Other objects and advantages will become apparent from the following description and from the accompanying drawings, in which:

Fig. 1 is a fragmentary side elevational view of a power driven rip saw embodying the preferred form of the invention.

Fig. 2 is an enlarged fragmentary plan view of the saw illustrated in Fig. 1.

Fig. 3 is an elevational view of the part of the saw shown in Fig. 2.

Fig. 4 is an end elevational view of the tool arm, as viewed from the right in Fig. 3, the saw blade being shown in section.

Fig. 5 is a sectional view of a saw blade of the swaged tooth type illustrating somewhat diagrammatically the various positions of the abrasive element.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The exemplary embodiment of the invention chosen for purposes of disclosure is illustrated as applied to the type of rip saw or jointer in which the saw blade is mounted on an arbor which overhangs the work table. A work table 5 is shown which may be mounted on the usual base frame of the machine (not illustrated) in any preferred manner. An endless feed chain 6, suitably guided and supported for travel longitudinally of the table, has its top surface elevated slightly above the surface of the table so that the chain will engage the work to move it through the machine. A saw arbor 7, rotatably mounted parallel to and above the table 5 in an overhanging portion 8 of the base frame, carries a saw blade 9 secured thereto so as to be positioned directly above the feed chain 6 in order to cut the work which is moved along the table by the chain.

In the machine illustrated herein a housing is provided for the saw blade 9 which housing comprises sections 10 and 11 slidably mounted on ways 12 formed on the overhanging portion 8 of the frame so that they may be parted and moved longitudinally of the machine to expose the saw 9 for jointing or removal. The housing may also serve as a means to support a plurality of pressure rollers 13 which are rotatably mounted at spaced intervals along the bottom of the housing so as to engage the top surface of the work pieces as they are moved to the saw by the feed chain.

For the purpose of truing the saw so that the tips of the teeth will be in peripheral alinement and hence cut uniformly, the invention contemplates preferably a device which may be mounted detachably on the machine frame. As shown herein, this device is mounted on the section 10 of the saw blade housing and comprises generally an adjustable supporting bracket 14 which may be attached to the housing 10, an arm 15 pivotally mounted on the bracket 14, and a holding or carrier member 16. This member is adjustably mounted on the free end of the arm 15 and is arranged to support abrasive elements 17.

The bracket 14 may be attached to the housing 10 by means of a plurality of tap screws 18, which pass through a plurality of openings 19 in the bracket to engage tapped holes formed in the housing. The openings 19 may be elongated as shown in Figs. 2 so as to facilitate the proper adjustment of the apparatus. The bracket has preferably a bifurcated portion formed by a pair of upstanding members 20 spaced laterally of the housing 10 and which have bearings 22 adapted to receive the pivot arm 15 therebetween. The arm 15 is mounted on and is adapted to turn with a pivot member 21 which is rotatably supported in the bearings 22 of the bracket. The arm 15 is provided with two laterally spaced lugs 23 having threaded apertures therethrough to admit a threaded portion on the pivot member 21. It will be apparent that the arm 15 may be adjusted laterally of the saw blade by turning the member 21 by means of a thumb screw 24 on one end thereof. In order that the arm 15 may be secured in any lateral position along its pivot member 21, the lugs 23 on the arm 15 may be split diametrically of the threaded openings as at 25, and clamping screws 26 provided. The bracket 14 is preferably positioned so that the arm 15, when swung about its pivot 21, moves the abrasive elements 17 substantially radially of the saw blade 9.

The member 16 is preferably mounted so as to be adjustable perpendicularly to the axis of the arm 15. Thus in the exemplary embodiment of the invention a pair of opposed inclined surfaces 27 on the holding member 16 are adapted to slide along ways 28 providing a perpendicular guideway 15ª formed on the free end of the arm 15, a thumb screw 29 being provided with which to secure the member in any desired position along the ways.

The member 16 is adapted to receive and hold a plurality of abrasive elements, in this case three, two of which are the elements 17, adapted to be brought into engagement with opposite sides of the saw blade teeth and another or central element 17ª which may be brought into engagement with the peripheral or top edge thereof. As herein shown the elements 17 and 17ª are secured to the member 16 by means of a plate 30, the elements being clamped between the plate and the member by means of a plurality of tap screws 31 which extend through the plate 30 into threaded engagement with the member 16. In order that the abrasive elements may be independently positioned and clamped, the plate is preferably divided as by slits 30ª formed therein (Fig. 4).

In attaining the objects of my invention the teeth of the saw 9 are preferably trued by first jointing the peripheral or top edges of the teeth so that all points thereon are equidistant from the axis of the saw, and then successively dressing the sides of the teeth until all of the teeth become uniform.

The jointing of the outer peripheral surface of the teeth is accomplished by moving the abrasive element 17ª substantially radially of the saw 9 into contact with the teeth. In dressing the sides of the teeth one of the elements 17 is first adjusted to the proper angle and may then be moved from a position A (Fig. 5) laterally of the saw 9 until the corner of the element 17 contacts the side of the saw as shown in position B. The element is then moved substantially radially of the saw to position C. During the latter part of the movement of the element 17 from position B to position C, the sides of the teeth will be dressed so that the tips of the teeth will be peripherally alined.

It is of course to be understood that my invention contemplates the truing of the saw by the above described steps either in the order stated or by first dressing the sides of the teeth.

When the exemplary form of the invention is utilized with a sawing machine such as illustrated herein it is contemplated that the arm 15, during the normal operation of the machine will be swung back into the dotted line position as shown in Fig. 3 and that when it is desired to true the teeth of the saw blade the housing sections 10, 11 will be parted as shown in Figs. 1 and 3 and the arm 15 swung from its remote and inoperative position down to the full line or operative position wherein the abrasive elements 17 straddle the teeth of the saw (Fig. 4). The arm is stopped in this position by engagement of the lower end of an adjusting screw 32, which is carried on the arm, with a lug 33 extending from the housing section 10.

To joint the top or peripheral edges of the teeth the abrasive element 17ª may be fed towards and into engagement with the teeth by means of the thumb screw 32. This screw may be provided with a lock nut 34 to secure the screw in its adjusted position.

To dress the side edges of the teeth the arm 15 is first adjusted by means of the screw 32 so that the element 17ª clears the teeth and so that when the arm is moved laterally by means of the pivot screw 21 an abrasive element 17 is moved from a position corresponding to A of Fig. 5 to that corresponding to B. In this B position the advance tip of the abrasive element may contact the saw blade, the edge of the abrasive element adjacent the sides of the teeth being parallel to the said sides. By manipulating the thumb screw 32 to swing the arm 15 outwardly from the saw the abrasive element is thereby fed into a position corresponding with that designated C in Fig. 5 wherein it engages the sides of the teeth. This procedure may then be repeated to dress the opposite side edges of the teeth by means of the other abrasive element 17.

It is believed apparent that by feeding the abrasive element outwardly from the axis of the saw when dressing the sides of the teeth there is no tendency for the tip of the teeth to gouge into the element such as is present if the element is fed laterally into engagement with the side edges. By truing the top edges and also the side edges while the saw blade is operating at its normal speed the teeth become properly jointed so that they will cut uniformly.

The method of truing the saw teeth which is herein disclosed is claimed in the applicant's divisional application Serial No. 425,693, filed February 3, 1930.

I claim as my invention:

1. A device for alining saw teeth adapted to be attached to a sawing machine having a work table, a rotary saw blade mounted thereover, and a split housing over said saw, the parts of said housing being movable to expose said saw, said device comprising an arm adapted to be pivotally mounted on one of the parts of said housing, a plurality of abrading elements adjustably mounted on the free end of said arm, means for moving said arm laterally of such a saw blade, and means mounted on said arm and adapted to cooperate with said housing for adjusting the free end of said arm relative to the edge of the saw.

2. A truing device adapted for use with a sawing machine having a base frame and a circular saw rotatably mounted thereon, said device comprising an arm adapted to be pivotally mounted on an axis parallel to the saw arbor in such a machine, a plurality of abrasive elements mounted on the free end of said arm, said arm being movable from an inoperative position with said elements remote from such a saw to an operative position in which said elements straddle the teeth of such a saw, means to adjust said arm laterally of the saw, and means to feed said arm angularly about its pivot.

3. A device for alining saw teeth comprising in combination a supporting bracket having a bifurcated end providing a pair of spaced bearings, a pivot member rotatably mounted in said bearings and having a screw threaded portion therebetween, an arm mounted on said screw threaded portion, means to adjust said arm angularly about said pivot, said arm having a perpendicularly extending guideway at its other end, a slide adjustably mounted on said guideway, a plurality of abrasive elements carried on said slide.

4. In a sawing machine of the type having a power driven circular saw and a housing over the upper portion of said saw, the combination of a device for alining the teeth of the saw, said device comprising a holder mounted on said housing for movement in a first direction substantially radially of said saw in a plane parallel to the plane of the saw and also for movement in a second direction substantially perpendicularly with respect to the plane of the saw, an abrasive element mounted on said holder for engagement with the angularly disposed side edges of the saw teeth, means for moving said holder in said second direction to bring said abrasive element into contact with the side of said saw, and a screw threaded device connected to said holder and acting between the holder and an integral portion of said housing to move said holder in said first direction to bring the abrasive element into contact with the side faces of the saw teeth.

5. A truing device adapted for use with a sawing machine having a base frame and a circular saw rotatably mounted thereon, said device comprising a supporting bracket adapted to be mounted on said frame adjacent to the saw, a holder mounted on said bracket and guided for movement thereon independently along one path parallel to the plane of the saw and along another path parallel to the rotative axis of the saw, a pair of abrasive elements mounted in said holder in laterally spaced relation to each other and adapted to be moved by said holder parallel to the plane of the saw into positions wherein they straddle the teeth of the saw and are out of contact with both sides of said teeth, screw threaded means operable to move said holder in either direction parallel to the axis of the saw to selectively engage said abrasive elements with the sides of the saw, and screw threaded means operable to move the holder outwardly of the saw parallel to the plane thereof to bring the selected one of the abrasive elements into operative contact with the angular side edges of the saw teeth.

6. In an apparatus for dressing the teeth of a saw, abrasive members for engaging the teeth, a pivoted arm for supporting the abrasive members, a base, lugs integral with the base, lugs associated with the pivoted arm, a screw rotatably mounted within apertures in the lugs of the base and engaging threads within one of the aforementioned lugs associated with the arm, and a knurled head for actuating the screw to move the arm lengthwise thereof.

7. In an apparatus for shaping saw teeth, a pivoted member adapted to be secured to the saw frame, said pivoted member being disposed in the plane of the saw, a supporting member carried by the pivoted member and adapted to receive a plurality of abrasive members for engaging the opposite surfaces of the saw teeth, and means for moving the supporting member transversely with respect to the pivoted member and radially with respect to the saw.

8. In an apparatus for shaping saw teeth, a member pivoted adjacent the saw, a supporting member mounted on the pivoted member and movable in the plane of the saw into and out of operative relation to the saw, means for adjusting the pivoted member longitudinally of its pivot, a jointing abrasive member mounted on the supporting member, and a pair of oppositely disposed dressing members mounted on the supporting member and independently adjustable toward and away from each other.

9. In an apparatus for shaping the teeth of a saw, a base adapted to be mounted on the saw frame, a plurality of abrasive members for engaging the teeth of the saw, a supporting member adapted to support the abrasive members in operative relation to the saw, and a pivot member rotatably mounted in the base and threadedly engaging the supporting member to pivotally mount the same and to permit adjustment thereof transversely to the plane of the saw.

In testimony whereof, I have hereunto affixed my signature.

LOUIS T. MEDHOLDT.